United States Patent [19]

Meyer

[11] 4,122,068
[45] Oct. 24, 1978

[54] POLYETHER DIHYDROXYALKYL CARBAMATE EPOXY ADDITIVE FOR EPOXY RESINS

[75] Inventor: Lee G. Meyer, Austin, Tex.

[73] Assignee: Texaco Development Corporation, New York, N.Y.

[21] Appl. No.: 786,749

[22] Filed: Apr. 11, 1977

[51] Int. Cl.² .............................................. C08G 59/42
[52] U.S. Cl. ................................ 528/93; 260/47 EA; 260/78.41; 260/830 R; 528/112; 528/113; 528/132; 528/370
[58] Field of Search .......... 260/47 EC, 47 EA, 78.41, 260/2 EC, 2 EA, 830 TW, 830 R

[56] References Cited
U.S. PATENT DOCUMENTS 3,275,587  9/1966  Weller et al. ...................... 260/29.2
3,496,119  2/1970  Weller et al. ............................ 260/2
3,499,007  3/1970  von Brachel et al. ............ 260/346.2

*Primary Examiner*—Harold D. Anderson
*Assistant Examiner*—E. A. Nielsen
*Attorney, Agent, or Firm*—Carl G. Ries; Thomas H. Whaley

[57] ABSTRACT

Resistance to thermal shock of certain anhydride cured epoxy resins is unexpectedly enhanced by addition of certain polyether dihydroxyalkyl carbamate additives. This superior resistance does not appreciably compromise heat deflection properties. The resins comprise a vicinal polyepoxide, a curing amount of a certain bicyclic anhydride and an effective amount of a polyether dicarbamate having terminal hydroxyalkyl carbamate groups and a molecular weight of from about 2000 to about 3000.

14 Claims, No Drawings

POLYETHER DIHYDROXYALKYL CARBAMATE EPOXY ADDITIVE FOR EPOXY RESINS

BACKGROUND OF THE INVENTION

1. Field of the Invention

This invention relates to curable epoxy resins having increased thermal shock resistance; and, more particularly, to certain anhydride cured epoxy resins containing certain polyether dihydroxyalkyl carbamate additives.

2. Prior Art

Epoxy resins constitute a broad class of polymeric materials having a wide range of physical characteristics. The resins are characterized by epoxide groups which are cured by reaction with certain catalysts or curing agents to provide cured epoxy resin compositions with certain desirable properties. One such class of curing agents are generally the anhydrides. The most commonly used anhydride curing agents are difunctional materials such as maleic anhydride, phthalic anhydride and the like, as well as tetrafunctional materials such as pyromellitic dianhydride.

Also known to be effective as epoxy curing agents or co-curing agents are various ureas and substituted ureas, such as those disclosed in U.S. Pat. Nos. 3,294,749, 2,713,569, 3,386,956, 3,386,955, 2,855,372 and 3,639,338. The ureas disclosed in the above references are useful as either a sole curing agents or as curing accelerators.

Epoxy resins for casting, embedding or encapsulating etc. must withstand repeated cycles of high and low temperatures without cracking. However, lowering the temperature increases stress due to shrinkage and reduces the ability of the resin to flow, thus relieving the stress.

Anhydride cured resins are useful in applications where high heat deflection is required. However, such materials exhibit brittleness and thus a low resistance to thermal shock. Diluents and modifiers do improve thermal shock resistance properties but, unfortunately, adversely influence the heat deflection properties as shown in May and Tanaka, Epoxy Resins, New York, 1973, p. 299. Likewise, plasticizers have not found wide acceptance in epoxy technology primarily because most of them are incompatible with the cured resins.

It has now been unexpectedly found that a specific dihydroxyalkyl carbamate terminated polyoxyalkylene material having a molecular weight of from about 2000 to about 3000, when employed as an epoxy additive, provides cured epoxy resin compositions exhibiting outstanding thermal shock resistance. Specifically, epoxy resins incorporating these additives, upon curing with a specific bicyclic anhydride curing agent, provide a material with high heat deflection and superior resistance to thermal shock.

SUMMARY OF THE INVENTION

According to the broad aspect of the instant invention, the thermal shock resistance of an epoxy resin cured with an alkyl substituted bicyclo vicinal anhydride is enhanced by the addition of an effective amount of a polyether dicarbamate having terminal hydroxyalkyl carbamate groups and having a molecular weight of from 2000 to about 3000.

In one aspect, a curable epoxy resin composition having superior thermal shock resistance comprises a vicinal polyepoxide; a curing amount of bicyclic vicinal anhydride curing agent of a Diels-Alder adduct of a substituted cyclopentadiene and maleic anhydride; and, an effective amount of the polyether dicarbamate additive.

In accordance with a preferred embodiment, a diglycidyl ether of 4,4'-isopropylidene bisphenol, a curing amount of a methyl-bicyclo [2,2,1] heptene-2,3-dicarboxylic anhydride curing agent, a dimethylaminomethyl substituted phenol accelerator and an effective amount of a polyether dicarbamate having terminal hydroxyalkyl carbamate groups and a molecular weight of about 2000 are utilized to form a resin.

DETAILED DESCRIPTION OF THE INVENTION

According to the instant inventive concept, blends of a polyepoxide, an anhydride curing agent and the dihydroxyalkyl carbamate terminated polyether containing compounds and, optionally, an accelerator are thoroughly admixed and cured in accordance with conventional methods to provide cured epoxy resins having unexpectedly superior thermal shock resistance while maintaining heat deflection properties.

Generally the vicinal polyepoxide containing compositions which are amine cured are organic materials having an average of at least 1.8 reactive 1,2-epoxy groups per molecule. These polyepoxide materials can be monomeric or polymeric, saturated or unsaturated, aliphatic, cycloaliphatic, aromatic or heterocyclic, and may be substituted if desired with other substituents besides the epoxy groups, e.g., hydroxyl groups, ether radicals, aromatic halogen atoms and the like.

Preferred polyepoxides are those of glycidyl ethers prepared by epoxidizing the corresponding allyl ethers or reacting, by known procedures, a molar excess of epichlorohydrin and an aromatic polyhydroxy compound, i.e., isopropylidene bisphenol, novolac, resorcinol, etc. The epoxy derivatives of methylene or isopropylidene bisphenols are especially preferred.

A widely used class of polyepoxides which are useful according to the instant invention includes the resinous epoxy polyethers obtained by reacting an epihalohydrin, such as epichlorohydrin, and the like, with either a polyhydric phenol or a polyhydric alcohol. An illustrative, but by no means exhaustive, listing of suitable dihydric phenols includes 4,4'-isopropylidene bisphenol, 2,4'-dihydroxydiphenylethylmethane, 3,3'-dihydroxydiphenyldiethylmethane, 3,4'-dihydroxydiphenylmethylpropylmethane, 2,3'-dihydroxydiphenylethylphenylmethane, 4,4'-dihydroxydiphenylpropylphenylmethane, 4,4'-dihydroxydiphenylbutylphenylmethane, 2,2'-dihydroxydiphenylditolylmethane, 4,4'-dihydroxydiphenyltolylmethylmethane and the like. Other polyhydric phenols which may also be co-reacted with an epihalohydrin to provide these epoxy polyethers are such compounds as resorcinol, hydroquinone, substituted hydroquinones, e.g., methylhydroquinone, and the like.

Among the polyhydric alcohols which can be co-reacted with an epihalohydrin to provide these resinous epoxy polyethers are such compounds as ethylene glycol, propylene glycols, butylene glycols, pentane diols, bis (4-hydroxycyclohexyl)dimethylmethane, 1,4-dimethylolbenzene, glycerol, 1,2,6-hexanetriol, trimethylolpropane, mannitol, sorbitol, erythritol, pentaerythritol, their dimers, trimers and higher polymers, e.g., polyethylene glycols, polypropylene glycols, triglycerol, dipentaerythritol and the like, polyallyl alcohol, polyhydric thioethers, such as 2,2'-, 3,3'-tetrahydroxydipropylsulfide and the like, mercapto alcohols such as monothioglycerol, dithioglycerol, and the like, polyhydric alcohol partial esters, such as monostearin, pentaerythritol monoacetate, and the like, and halogenated polyhydric alcohols such as the monochlorohydrins of glycerol, sorbitol, pentaerythritol and the like.

Another class of polymeric polyepoxides which can be anhydride cured and are in accordance with the instant invention includes the epoxy novolac resins obtained by reacting, preferably in the presence of a basic catalyst, e.g., sodium or potassium hydroxide, an epihalohydrin, such as epichlorohydrin, with the resinous condensate of an aldehyde, e.g., formaldehyde, and either a monohydric phenol, e.g., phenol itself, or a polyhydric phenol. Further details concerning the nature and preparation of these epoxy novolac resins can be obtained in Lee, H. and Neville, K., *Handbook of Epoxy Resins*, McGraw Hill Book Co., New York, 1967.

It will be appreciated by those skilled in the art that the polyepoxide compositions which are useful according to the practice of the present invention are not limited to those containing the above described polyepoxides, but that these polyepoxides are to be considered merely as being representative of the class of polyepoxides as a whole.

The anhydride curing agents which can be utilized in accordance with the instant invention are generally the alkyl substituted bicyclic vicinal anhydrides, for example, the Diels-Alder adduct of maleic anhydride and a substituted cyclopentadiene. Preferred compounds generally have the formula:

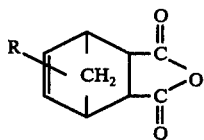

where R is a lower alkyl and, more preferably, a lower alkyl of from 1 to 4 carbon atoms. Preferred lower alkyl groups include methyl, ethyl, propyl, and n-butyl. The most preferred alkyl is methyl. The most preferred anhydride is methyl-bicyclo [2,2,1] heptene -2,3-dicarboxylic anhydride.

The polyether dicarbamate additive can generally be described as polyoxyalkylene containing materials having terminal hydroxyalkyl carbamate groups and a molecular weight of from about 2000 to about 3000. More specifically, these compounds are polyoxyalkylene compounds having terminal hydroxyalkyl carbamate groups, of the formula:

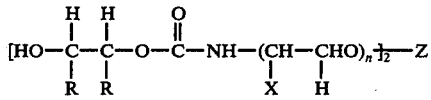

wherein each R is, independently, hydrogen; or a branched or straight chain alkyl radicals of from 1 to about 6 carbon atoms, and, more preferably, from 1 to about 4, X is hydrogen, a methyl radical or an ethyl radical; Z is a hydrocarbon alkylene radical having 2 to 5 carbon atoms and $n$ is a number selected such that the molecule of the above formula has a molecular weight of from about 2000 to about 3000. The preferred dihydroxyalkyl carbamates are of the above formula where R is hydrogen or a lower alkyl radical, X is a methyl radical; Z is a 1,2-propylene radical; and $n$ is a number from 16 to 19. Preferred lower alkyl groups include methyl, ethyl, n-propyl and n-butyl.

The polyether dicarbamate compounds are formed by the reaction of a hydroxyalkyl carbamate forming compound with a polyoxyalkylene diamine having a molecular weight such that the hydroxyalkyl carbamate terminated product has a molecular weight of from about 2000 to about 3000 at temperatures in the range from about 100° C. to about 170° C. in a molar ratio of about 1 mole of hydroxyalkyl carbamate forming compound for each mole of terminal amine.

The diamines that are useful in forming the additives are polyoxyalkylene diamines of the formula:

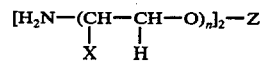

wherein X is a hydrogen, a methyl radical or an ethyl radical; Z is a hydrocarbon alkylene radical having from 2 to 5 carbon atoms; and, $n$ is a number from about 15 to about 25. Preferred polyoxypropylene diamines are those wherein X is a methyl radical, $n$ is a number from 16 to 19, Z is a 1,2-propylene radical. These polyoxyalkylene polyamines can be prepared by known methods as disclosed in U.S. Pat. Nos. 3,236,895 and 3,654,370. It will be realized that $n$ as represented herein is an average number and not an integer.

The hydroxyalkyl carbamate forming compounds are generally those which supply the O=C—O—CC—OH radical. The ethylene carbonates including the alkyl substituted ethylene carbonates are the preferred compounds.

The functionality of the polyoxyalkylenepolyamine is dependent upon the number of terminal primary amino groups, which in the instant case is preferably 2. It will be realized that each mole of hydroxyalkyl carbamate forming compound will react with a single terminal primary amino group of the polyoxyalkylenepolyamine. It is particularly important that, in forming the additive compounds of the instant invention, a specific molar ratio of reactants be maintained. Specifically about 1 mole of hydroxyalkyl carbamate forming compound of each amino group of the polyoxyalkylenepolyamine is required. Thus, with the diamine, about 2 moles of hydroxyalkyl carbamate forming compound is utilized. Preferably the instant reaction is carried out in the presence of a slight excess of the carbamate forming compound to assure complete conversion of the amino groups.

Optionally, the epoxy resin formulations of the instant invention can include an "accelerator" to speed the anhydride cure of the epoxy resin, especially at ambient temperatures. In several applications, such acceleration is beneficial, especially when an epoxy resin is used as an adhesive in flammable environment, thus making elevated temperature cure inconvenient or even hazardous. Lee, H. and Neville, K., *Handbook of Epoxy Resins*, pp. 7–14 describes the use of certain amine-containing compounds as epoxy curing agent-accelerators.

Accelerators are known in the art which can be utilized in accordance with the instant invention; for example tertiary amines such as those disclosed in U.S. Pat. No. 2,839,480. Preferred accelerators in accordance with the instant invention are the dialkyl amine substituted aromatic; and, preferably, the dimethyl amino methyl substituted phenols.

According to the method of the instant invention, the thermal shock resistant properties of certain prior art anhydride cured epoxy resins are enhanced by the addition of an effective amount of a polyether dicarbamate having terminal hydroxyalkyl carbamate groups and a molecular weight of from about 2000 to about 3000 as hereinbefore described. The amount of additive effective in bringing about the increased adhesive property is somewhat empirical and will depend upon the resin, and the use of an accelerator. Generally, the dicarbamate additive can be utilized in amounts from about 5 to about 35 parts by weight based on one hundred parts by weight of the resin constituent; and, preferably, from about 10 to about 20 parts by weight.

Although somewhat empirical, the exact amount of additive which is effective to increase the thermal shock resistance can readily be determined without undue experimentation owing to the fact that a resin mixture containing an effective amount of the additive will undergo changes which are readily visible as curing proceeds. Specifically, the curing resin takes on an opaque, milky white appearance that becomes more pronounced during curing and results in a product which has a lustrous white appearance. It will be realized that, advantageously, this optical absorption shift enhances the beauty of cast objects and negates the need to use white pigments or fillers.

Preferably the thermal shock resistant properties of prior art resins are enhanced by addition of an effective amount of the polyoxypropylene dicarbamate additive based upon the condensation of 2 moles ethylene carbonate with 1 mole of a polyoxypropylenediamine having a molecular weight of 2000. The preferred resins comprise polyglycidyl ethers of a polyhydric phenols cured by incorporating therein a curing amount of methyl bicyclo [2,2,1] heptene-2,3-dicarboxylic anhydride and a dimethylamino methyl substituted phenol accelerator.

The curable epoxy resin compositions of the instant invention generally comprise a vicinal polyepoxide, a curing amount of the alkyl substituted bicyclic vicinal anhydride curing agent and an effective amount of the polyether dicarbamate additive. Optionally an accelerator can be added.

The anhydride cured resins, having superior thermal shock resistance without substantial deterioration of heat deflection, in accordance with the instant invention, are prepared in a conventional manner. The anhydride curing agent is admixed with the polyepoxide composition in amounts according to the functional carboxyl equivalent weight of the curing agent employed. Generally the number of equivalents of carboxyl groups is from about 0.8 to about 1.2 times the number of epoxide equivalents present in the curable epoxy resin composition, with from 0.9 to a stoichiometric amount being preferred. When using an accelerator, amounts from 1 to about 5 parts by weight based on 100 parts by weight of the resin are generally satisfactory. The exact amount of constituents in accordance with the above general requirements will depend primarily on the application for which the cured resin is intended.

The dicarbamate additive is incorporated into the uncured resin by admixing. Preferably, the additive is first admixed with the curing agent and/or the accelerator prior to addition to the resin. The constituents forming the curable material are then intimately admixed by standard methods and degassed in the presence of a commercial defoamer and minute amounts of silicone oils to prevent voids and bubbles.

Although all of the epoxy resins disclosed herein are generally useful in accordance with the instant inventive concept, those based on aliphatic compounds are preferably not used exclusively. The presence of resins containing polyglycidyl ethers of polyhydric phenols in amounts greater than 50% by weight of the resin constituent, and more preferably 80% by weight and more preferably 100% by weight has been shown to greatly enhance the desirable properties of the cured material.

In accordance with a preferred embodiment, a curable resin comprises a diglycidyl ether of 4,4'-isopropylidene bisphenol; a curing amount of an anhydride curing agent consisting essentially of methyl bicyclo [2,2,1]heptene 2,3-dicarboxylic anhydride, an accelerator of dimethylaminomethyl substituted phenol; and, an effective amount of a polyether dicarbamate having terminal hydroxyethyl carbamate groups and a molecular weight of about 2000. According to a greatly preferred embodiment, from about 80 to about 90 parts by weight of curing agent is used per 100 parts of resin.

A preferred ratio of constituents comprises from about 1 to about 5 parts by weight of accelerator; from 80 to 90 parts by weight anhydride curing agent; and from 5 to 35 parts by weight additive wherein all of the above amounts are based on 100 parts by weight of the resin. Generally, the mixture of epoxy resin, the polyether dicarbamate, anhydride curing agent, and the accelerator is allowed to self-cure at elevated temperatures up to about 200° C.

According to a greatly preferred embodiment, resins of the polyglycidyl ether of polyhydric phenol type are cured by incorporating therein from about 80 to 90 parts by weight of methyl bicyclo [2,2,1] heptene-2,3-dicarboxylic anhydride; from about 5 to 40 parts by weight of the dihydroxyethyl carbamate terminated polyoxyalkylene amine having a molecular weight of about 2000; and from 1 to 5 parts by weight of an accelerator consisting essentially of dimethylaminomethyl substituted phenol. The composition is cured at temperatures in the range of 100° C. to 190° C. to produce products having superior thermal shock resistance in accordance with the instant invention.

It will further be realized that various conveniently employed additives can be admixed with the polyepoxide containing composition of the instant invention prior to final cure. For example, in certain instances it may be desired to add minor amounts of other anhydride cocatalysts. Additionally, conventional pigments, dyes, fillers, flame retarding agents and the like which are compatible, natural or synthetic resins can be added.

Furthermore, although not preferred, known solvents for polyepoxide materials such as toluene, benzene, xylene, dioxane, ethylene glycol monomethylether and the like can be used. The polyepoxide resins containing the additives of the instant invention can be used in any of the above applications for which polyepoxides are customarily used.

One outstanding feature of the instant composition resides in the fact that they are opaque upon curing and give a smooth, white lustrous surface which may be of particular benefit for certain molding and casting operations. The compositions of the instant invention cn be used as impregnants, surface coatings, pottings, capsulating compositions, and laminants.

The following examples illustrate the nature of the instant invention but are not intended to be limitative thereof.

EXAMPLE I

In this example a polyether dihydroxyalkyl carbamate terminated additive for use in accordance with the instant invention was prepared. Into a suitable reaction vessel, equipped with stirring apparatus, were added 1370 grams (0.72 moles) of a polyoxypropylenepolyamine having a molecular weight of approximately 2000, and an analysis of 1.01 milliequivalents (meq.) primary amine/g sold under the tradename "JEFFAMINE® D-2000" by Jefferson Chemical Co., Austin, Texas 78751 and 130 grams of ethylene carbonate (1.48 moles). The admixture was heated to 135°–150° C. The crude reaction product was then vacuum stripped at 130°–175° C./1.4 mm Hg. The product, upon analysis, showed 0.21 meq. total amine/g, 0.19 meq. primary amine/g, hydroxyl number 37.6.

EXAMPLES II–XI

The following examples show the resins containing the additives in accordance with the instant invention are unexpectedly resistant to thermal shock.

Resins for the following examples were prepared in accordance with the formulations shown in Table I below. Approximately 50 g samples were utilized to encapsulate steel washers (1 inch o.d., ⅜ inch i.d., 1/16 inch thick) supported by ¼ inch ring of filter paper cut from Whatham 19 × 19 mm. cellulose extraction thimble. The encapsulations were formed in aluminum milk text evaporating dishes (5 cm dia. × 1 cm deep). The results are shown in Table II following.

TABLE I

| Formulation[1] | A | B | C |
|---|---|---|---|
| Epoxide, pbw (Eq. 190) | 100 | 100 | 100 |
| Curing agent, pbw[2] | 85 | 85 | 85 |
| Acelerator, pbw[3] | 2.5 | 2.5 | 2.5 |
| Dicarbamate[4] | — | 10 | 20 |

TABLE II

| Number of samples cracked during cycles Formulation[5] | Examples | | | | | | | | | |
|---|---|---|---|---|---|---|---|---|---|---|
| | 2 | 3 | 4 | 5 | 6 | 7 | 8 | 9 | 10 | 11 |
| A | 6 | 1 | 3 | —[6] | — | — | — | — | — | — |
| B | 3 | 0 | 0 | 1 | 0 | 1 | 2 | 0 | 0 | 0 |
| C | 2 | 0 | 0 | 1 | 0 | 3 | 0 | 0 | 0 | 1 |

[1]Cure cycle : 100 C for 2 hr., 130° C for 1 hr., then 150° C for 3 hr.
[2]"Nadic Methyl Anhydride" sold by Allied Chemical Corporation, Morristown, N.J. 07960
[3]"DMP-10" sold by Rohm and Haas, Philadelphia, Pa. 19105
[4]Product of Example I
[5]Thermal cycle: Oven at 140° C (30 mins.), bath at −20° C (15 mins.), room temperature (15 mins.). Examined for cracking and, if unchanged, recycled to oven.
[6]All 10 samples were cracked after cycle 3.

Examples II–XI show the improvement of thermal shock resistance resulting from the addition of the carbamate additive.

In order to demonstrate the unexpectedly superior properties of resins prepared in accordance with the instant invention, commercial anhydride curing agents other than the alkyl-bicyclo [2,2,1] heptane dicarboxylic anhydrides of the instant invention are used.

EXAMPLES XII–XXI

In these examples hexahydrophthalic anhydride is used as the curing agent with a benzyldimethylamine accelerator. Table III presents the formulations of the cured resins produced with the alternate curing agent. The cured resins are then subjected to testing for thermal shock resistance in accordance with the procedures of Examples II–XI. The results of this testing, in which ten samples of each formulation were used, are shown in Table IV. These examples demonstrate the diminished thermal shock resistance of these alternately prepared resins as compared with resins prepared in accordance with the instant invention.

TABLE III

| Formulation[1] | A | B | C |
|---|---|---|---|
| Epoxy resin (EEW 190), pbw | 100 | 100 | 100 |
| Hexahydrophathalic anhydride, pbw | 78 | 78 | 78 |
| Benzyldimethylamine, pbw | 1 | 1 | 1 |
| Dicarbamate[2] | 0 | 0 | 0 |

TABLE IV

| Number of samples cracked during cycles[3] Formulation | Examples | | | | | | | | | |
|---|---|---|---|---|---|---|---|---|---|---|
| | 12 | 13 | 14 | 15 | 16 | 17 | 18 | 19 | 20 | 21 |
| A | 4 | 1 | 1 | 0 | 1 | 0 | 0 | 0 | 1 | 0 |
| B | 7 | 1 | 0 | 0 | 0 | 0 | 0 | 0 | 0 | 0 |
| C | 3 | 0 | 0 | 0 | 0 | 0 | 0 | 3 | 1 | 0 |

[1]Cure cycle: at 100° C, 1 hr. at 130° C, 3 hr. at 150° C.
[2]Product of Example I.
[3]Thermal cycle: oven at 140° C (30 mins.), bath at −20° C (15 mins.), room temperature (15 mins.). Examined for cracking and, if unchanged, recycled to oven.

EXAMPLES XXII–XXXI

In the following examples epoxy resins are prepared using phthalic anhydride as a curing agent and benzyldimethylamine as the accelerator. The formulations for these resins are shown in Table V. The cured resins are then subjected to to testing for thermal shock resistance in accordance with procedures of Examples II–XI. The results of this testing, in which ten samples of each formulation were used, are shown in Table VI. These examples demonstrate that the epoxy resins cured in accordance with the instant invention provide improved thermal shock resistance over resins cured with phthalic anhydride alone.

TABLE V

| Formulation[1] | A | B |
|---|---|---|
| Epoxy resin (Eq. 190), pbw | 100 | 100 |
| Phthalic anhydride, pbw | 75 | 75 |
| Benzyldimethylamine, pbw | 1 | 1 |
| Dicarbamate[2] | 0 | 0 |

TABLE VI

| Number of samples cracked during cycles[3] Formulation | Examples | | | | | | | | | |
|---|---|---|---|---|---|---|---|---|---|---|
| | 22 | 23 | 24 | 25 | 26 | 27 | 28 | 29 | 30 | 31 |
| A | 6 | 2 | 0 | 0 | 0 | 1 | 0 | 0 | 0 | 0 |
| B | 0 | 0 | 0 | 0 | 0 | 0 | 0 | 0 | 0 | 0 |

[1]Cure cycle: 1 hr. at 100° C, 4 hr. at 160° C
[2]Prepared in accordance with Example I
[3]Thermal cycle: oven at 140° C (30 mins.), bath at −20° C (15 mins.), room temperature (15 mins.). Examined for cracking and, if unchanged, recycled to oven.

While the invention has been explained in relation to its preferred embodiment, it is to be understood that various modifications thereof will become apparent to those skilled in the art upon reading the specification and is intended to cover such modifications as fall within the scope of the appended claims.

What is claimed is:

1. An epoxy resin composition having superior resistance to thermal shock and being the cured product of a curable admixture which comprises:
   a vicinal polyepoxide having an epoxide equivalency of greater than 1.8;
   a curing amount of a substituted bicyclic vicinal dicarboxylic anhydride curing agent; and,
   an effective amount of an additive consisting essentially of a polyoxyalkylene dicarbamate having terminal hydroxyalkyl carbamate groups and a molecular weight of from about 2000 to about 3000.

2. The composition of claim 1 further comprising an effective amount of a composition effective in accelerating the cure.

3. The composition of claim 2 wherein said dicarbamate is of the formula

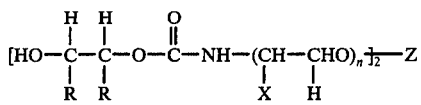

wherein each R is, independently, hydrogen; or a branched or straight chain alkyl radical of from 1 to about 6 carbon atoms; X is hydrogen, a methyl radical or an ethyl radical; Z is a hydrocarbon alkylene radical having 2 to 5 carbon atoms and $n$ is a number selected such that the molecule of the above formula has a molecular weight of from about 2000 to about 3000.

4. The composition of claim 3 wherein each R is, independently, hydrogen, X is a methyl radical, Z is a 1,2-propylene radical; and $n$ is an average number from 16 to 19.

5. The composition of claim 2 wherein said vicinal polyepoxide is more than 80% by weight of a polyglycidyl ether of polyhydric phenols; and wherein said composition effective in accelerating the cure comprises a dialkyl amine substituted aromatic compound.

6. The composition of claim 5 wherein said vicinal polyepoxide is a polyglycidyl ether of a polyhydric phenol; wherein said curing agent is methyl-bicyclo [2,2,1] heptene-2,3-dicarboxylic anhydride.

7. A method for increasing the resistance to thermal shock of an epoxy resin composition, being the cured product of a curable admixture comprising a vicinal polyepoxide having an epoxide equivalency of greater than 1.8; and, a curing amount of a substituted bicyclic vicinal dicarboxylic anhydride comprising the step of:
   adding to said curable admixture an effective amount of a polyoxyalkylene dihydroxyalkyl carbamate additive having a molecular weight of from about 2000 to about 3000.

8. The method of claim 7 wherein said dicarbamate is of the formula

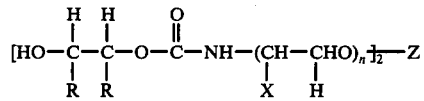

where each R is, independently, hydrogen; or a branched or straight chain alkyl radical of from 1 to about 6 carbon atoms; X is hydrogen, a methyl radical or an ethyl radical having 2 to 5 carbon atoms and $n$ is a number selected such that the molecule of the above formula has a molecular weight of from about 2000 to about 3000.

9. The method of claim 8 wherein each R is, independently, hydrogen; X is a methyl radical; Z is a 1,2-propylene radical; and $n$ is an average number from 16 to 19.

10. The method of claim 9 wherein said curable admixture further comprises an effective amount of a composition effective in accelerating the cure.

11. The method of claim 10 wherein said vicinal polyepoxide is more than 80% by weight of a polyglycidyl ether of polyhydric phenols; and wherein said composition effective in accelerating the cure comprises a dialkyl amine substituted aromatic compound.

12. The method of claim 11 wherein said vicinal polyepoxide is a polyglycidyl ether of a polyhydric phenol; wherein said methyl-bicyclo [2,2,1] heptene-2,3-dicarboxylic anhydride.

13. A curable resin composition comprising a diglycidyl ether of 4,4'-isopropylidene bisphenol polyepoxide; a curing amount of a curing agent consisting essentially of methyl-bicyclo [2,2,1] heptene-2,3-dicarboxylic anhydride, an accelerator of dimethylaminomethyl substituted phenol; and, an effective amount of a polyoxyalkylene carbamate additive having terminal hydroxyethyl carbamate groups and a molecular weight of about 2000.

14. The resin of claim 13 wherein said curing agent is present in about 80 to about 90 parts by weight based on 100 parts resin, said accelerator is present in amount from about 1 to 5 parts by weight based on 100 parts by weight said polyepoxide, said additive is present in amount from about 5 to 35 parts by weight based on 100 parts by weight of said polyepoxide.

* * * * *